United States Patent Office 3,037,702
Patented June 5, 1962

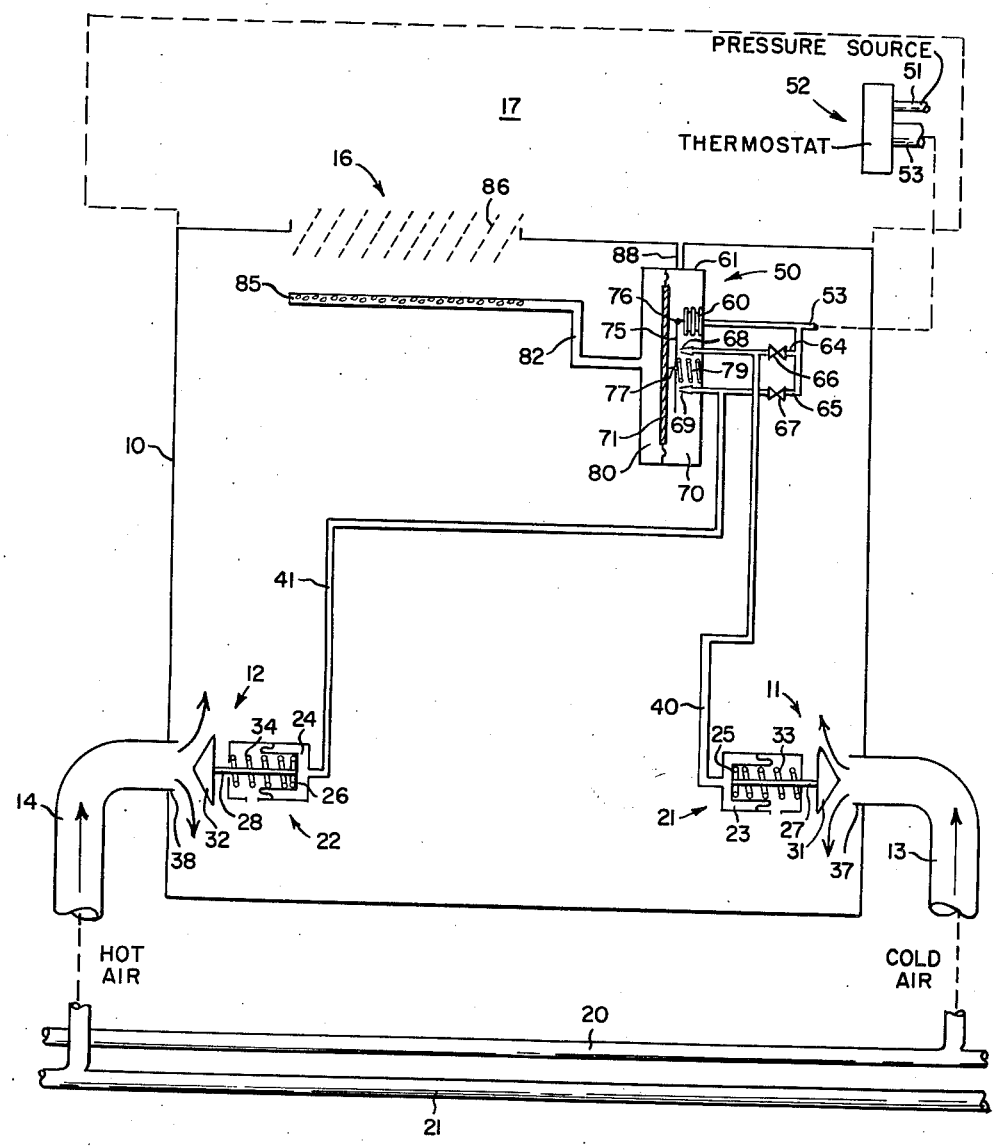

3,037,702
AIR CONDITIONING APPARATUS HAVING TEMPERATURE AND PRESSURE CONTROL
Kenneth H. Mauer, Roselle, and Richard C. Mott, Harwood Heights, Ill., assignors to Minneapolis-Honeywell Regulator Company, Minneapolis, Minn., a corporation of Delaware
Filed Feb. 8, 1960, Ser. No. 7,314
6 Claims. (Cl. 236—13)

Our invention relates to air conditioning control apparatus for double duct air conditioning systems, and more particularly, to improved control apparatus for mixing valves or blender equipment having pressure and temperature control.

The increasing emphasis on year-round air conditioning has led to a widespread usage of air conditioning apparatus in which individual air mixing or blender boxes or valves mix air from main line trunks or ducts having hot and cold tempered air conditioning medium or air therein to discharge the same directly to the space to be air conditioned at a proper temperature to meet space temperature requirements and in a proper amount to provide constant circulation of the conditioning medium. This arrangement is generally applied to large installations where the temperatures in a large number of individual spaces are individually and selectively controlled. The temperature of the air conditioning mediums in the master or main ducts is separately maintained and individual space requirements are controlled by the components which valve and mix the air conditioning mediums from the sources. With the increased usage of this type of air conditioning control equipment, emphasis has been placed on simplification to reduce the original and installation costs. While self contained valves have been utilized in the past to simplify the control apparatus, these valves are not standard devices and require additional cost in maintenance as well as having an original increased cost. Therefore it is an object of this invention to provide an improved air conditioning control apparatus of the blender or double duct type which utilizes as many standard components as possible. A further object of this invention is to provide an air conditioning control apparatus of this type in which a single power source is utilized to simplify the installation cost of the apparatus. It is further an object of this invention to provide apparatus of this type in which a single control line from a pneumatic thermostat positioned in the space to be air conditioned will supply the control signal and power for operation of the valves contained in the blender equipment. These and other objects of this invention will become apparent from a reading of the attached description together with the drawing.

The single FIGURE of the drawing shows a schematic disclosure of the improved air conditioning control apparatus.

Our improved air conditioning control apparatus is shown diagrammatically in the drawing as a mixing box or blender box indicated at 10 which contains a pair of valves 11 and 12 positioned in inlets 13 and 14 to the mixing box. The inlets 13 and 14 are adapted to be connected to sources of air conditioning medium in the form of ducts 20—21 respectively which supply the source of cold and hot tempered air conditioning medium, the temperature of the air conditioning medium therein being controlled independently from suitable heat exchangers which form no part of the present invention. In addition to the inlets 13, 14, box 10 includes an outlet 16 which is connected directly to or indirectly to the space 17 to be air conditioned. Box 10 will normally be positioned in or located adjacent to the space 17 to be air conditioned.

The particular control apparatus disclosed herein is of the pneumatic type employing conventional piston or diaphragm type motors operating conventional valve closure members which are shown schematically in the drawing. Thus it will be seen that valves 11 and 12 are operated by motor units indicated at 21—22 respectively, the motors having a power or pressure chamber indicated at 23—24 into which a control air pressure is bled to move the movable element or diaphragm 25—26 respectively with an actuating shaft 27, 28 respectively attached thereto to operate the closure members 31, 32 against valve seats indicated at 37, 38. It will be seen from the drawing that the variation in pressure in the chambers 23, 24 of the motors 21, 22 will operate against springs 33, 34 respectively to position the valve elements 31, 32 to control the flow of air conditioning medium through the inlets 13, 14 to the interior of the mixing box or casing 10.

The motors 21, 22 for valves 11, 12 are operated by variation in branch line pressures applied to the pressure chambers 23, 24 of the motors, this control pressure being delivered through conduits 40, 41 from a flow regulator indicated generally at 50. The air source for this pneumatic flow regulator is derived from a pressure source indicated at 51 which is connected to a thermostat 52 positioned in the space to be air conditioned with a single control line leading from the thermostat, as indicated at 53, to supply a branch line pressure to the flow regulator 50 positioned in or at the mixing chamber as a part of the mixing box. Thus it will be later noted that the control source for operating the motors is derived from the single source line 53 leading to the mixing chamber in the space to be air conditioned. This arrangement will permit a simplicity in installation and the use of conventional pressure operators rather than self contained motors to provide a simplified control apparatus which is dependable and requires a minimum of maintenance while being readily adaptable to any type of valve mechanism. At the mixing chamber, the inlet line or conduit 53 leads directly to a bellows chamber 60 positioned in the casing 61 of the flow regulator 50 where the branch line pressure actuates the bellows in a manner to be later defined. Also connected to the inlet conduit 53 are a pair of conduits indicated generally at 64, 65 which conduits include restrictions 66, 67 to supply a source of pneumatic pressure to a pair of nozzles 68, 69 connected to the conduits 64, 65 respectively and terminating in the casing 61 of the flow regulator in a chamber indicated at 70 which is defined by the casing and a diaphragm 71 positioned therein. As will be later noted, the nozzles 68, 69 or the conduits 64, 65 beyond the restrictions 66, 67 are connected respectively to the conduits 40, 41 leading to motors 21, 22 respectively. Thus the chamber 70 of flow regulator contains the extremities of the nozzles 68, 69 and the bellows 60. Also included in the chamber 70 is a flapper or lever 75 which is pivoted at one extremity as at 76 on the extremity of the bellows 60 and midway along its extent as at 77 through a pivotal connection which is connected to the center of the diaphragm 71. Opposite the pivotal connection is positioned a spring 79 which urges the lever and the diaphragm attached thereto in the direction toward the diaphragm and away from the nozzles 68, 69. Thus the flapper or lever will be positioned along its extent adjacent the extremities of the nozzles 68, 69 and with movement of the bellows 60 upon expansion, the lever will pivot about the pivot 77 on the diaphragm to differentially place the sides of the flapper or lever with respect to the nozzles 68, 69, increasing pressure in one nozzle and decreasing pressure in the other with a reverse of operation upon the collapse of the bellows 60. Similarly, movement of the diaphragm in the direction toward the nozzles will move the lever about the pivot 76 to increase pressure at the nozzles 68, 69 simultaneously while movement in the opposite direction will decrease pressure at the nozzles. The casing 61 and diaphragm 71 define a second chamber 80 of the flow regulator to which is connected a source of air adapted to move the diaphragm against the bias of the spring 69. This chamber 80 is connected through a conduit 82 to a box static pressure sensing element or pressure sensor 85 positioned within the mixing box and designed to sense pressure within the box which, as will be later noted, is compared with pressure within the space to be air conditioned and will provide a differential pressure at the regulator indicative of total flow at the outlet of the blended and mixed air conditioning medium to be discharged to the space to be air conditioned. Sensor 85 is shown herein as located at or near the outlet 16 of the mixing box adjacent discharge louvers 86, but it will be understood that the static pressure sensor 85, which is conventional, may be located at any point within the mixing box where a uniform static box pressure exists. Sensor 85 is basically a continuation of the tube or conduit 82 with an aperture or apertures therein which transmits or conveys the pressure at a particular point within the mixing box 10 at which the sensor is located to the chamber 80 in a conventional manner. This pressure as it increases above a fixed reference defined by the spring 79 and space pressure will increase the pressure simultaneously at the nozzles 68, 69 to increase pressure to the motors 21, 22, closing valves 11 and 12 and upon a decrease in pressure below the fixed reference will move the diaphragm 71 in a direction to reduce pressures at the nozzles 68, 69 and hence to the motors 21, 22 respectively to cause opening of the valves 11 and 12. Also included as part of the flow regulator is a conduit 88 connected to the chamber 70 and downstream of the outlet to provide the space reference pressure source which, together with the bias of spring 79, will determine the differential flow pressure indicative of or proportional to a desired constant total flow from the box or mixing chamber. The conduit 88 also provides a bleed path for the chamber 77 since it will normally be connected to a pressure source lower than that of the nozzles, allowing the chamber 70 to bleed off the nozzles' discharge.

In operation, the pneumatic control air conditioning apparatus utilizes a single pressure source from the thermostat both as a signal in operation on the flow regulator and also as a source of power to the nozzles or bleed ports to provide pressures to control the motors 21, 22 operating the valves 11, 12 at the inlets of the air conditioning system. Thus a branch line pressure or thermostat branch line pressure determined by the thermostat 52 will operate on the bellows to differentially position the flapper 75 relative to the nozzles 68, 69 to establish separate branch line pressures in the control of the motors 21, 22. The source of power for operation of these motors is taken from the thermostat branch line pressure source or conduit 53 which is connected through restrictions 66, 67 to establish secondary pressure sources in operation of the motors which sources are controlled by operation of the flow regulator. Total outflow from the box is sensed by a pressure proportional thereto or a direct measure of the pressure in the mixing box or at the discharge outlet 16 of the mixing box 10 through the sensor 85 which is connected to the second chamber 80 in the flow regulator 50 to operate against the reference pressure on the diaphragm 71 and the bias of spring 79 to directly control the pressures of both of the nozzles simultaneously by urging the flapper 75 toward or away from the nozzles about the pivot point 76 of the lever. This chamber is connected to the space such that the differential between static pressure at the mixing box outlet and downstream or space pressure will give an indication of total flow from the box.

With this arrangement, simplified motors and valves may be utilized in a blending box or mixing box with a single pneumatic power source connected to the thermostat and from the thermostat to the mixing box greatly simplifying the installation and equipment required for operation of the control system. In considering this invention it should be remembered that the present disclosure is intended to be illustrative only, and we wish to be limited only by the appended claims.

We claim as our invention:

1. In air conditioning apparatus, a mixing box, a pair of inlets connected to said box and adapted to be connected to sources of a tempered air conditioning medium of different temperatures, valve means included in each of said inlets and adapted to control the flow of air conditioning medium through said inlets from said sources to the interior of said box, outlet means included in said box and adapted to discharge the tempered air therefrom to a space to be air conditioned, individual motor means positioned in said box and operatively connected respectively to said valve means in said inlets to operate said valve means, a thermostat positioned in the space to be air conditioned from said box, a source of control air pressure connected to said thermostat, a single output conduit from said thermostat connected to said mixing box having a control air pressure therein established by operation of said thermostat, a flow regulator positioned in said mixing box having a plurality of inlet connections thereto, one of said inlet connections to said flow regulator control being connected to said single conduit and terminating in a bellows in said flow regulator, another pair of inlet connections to said flow regulator each including a restriction connected to said single conduit from said thermostat and terminating in said flow regulator in a pair of nozzles, diaphragm means positioned in said flow regulator and dividing said flow regulator into a pair of chambers a first of which includes said nozzles and said bellows, lever means pivoted at one extremity on said bellows and extending adjacent said nozzles to cooperate with said nozzles and establish a second and third control pressure therein, pivot means attached to said diaphragm and to said lever at a point along its extent intermediate said nozzles such that said lever means may pivot about said second named pivot means differentially with respect to said nozzles, biasing means positioned in said first chamber and against said lever means urging said lever means against said diaphragm, means including conduit means transmitting pressures existing in said box near the outlet thereof, said means being connected to the second of said chambers of said flow regulator to cause said diaphragm with said lever means attached thereto to move relative to said nozzles with variation in pressures in said box, and conduit means connected to each of said nozzles in said box and connected respectively to said motor means for operating said valves in accordance with the pressures controlled by said nozzles and said lever means.

2. In air conditioning apparatus, a mixing box, a pair of inlets connected to said box and adapted to be connected to sources of a tempered air conditioning medium of different temperatures, valve means included in each of said inlets and adapted to control the flow of air conditioning medium through said inlets from said sources to the interior of said box, outlet means included in said box and adapted to discharge the tempered air therefrom to a space to be air conditioned, individual motor means positioned in said box and operatively connected respectively to said valve means in said inlets to operate said valve means, a thermostat positioned in the space to be air conditioned from said box, a source of control air pressure connected to said thermostat, a single output conduit from said thermostat connected to said mixing box having a control air pressure therein established by operation of said thermostat, a flow regulator positioned in said mixing box having a plurality of inlet connections thereto, one of said inlet connections to said flow regulator being connected to said single conduit and terminating in a bellows in said flow regulator, another pair of inlet connections to said flow regulator each including a restriction connected to said single conduit from said thermostat and terminating in said flow regulator in a pair of nozzles, diaphragm means positioned in said flow regulator and dividing said flow regulator into a pair of chambers a first of which includes said nozzles and said bellows, lever means pivoted at one extremity on said bellows and extending adjacent said nozzles to cooperate with said nozzles and establish a second and third control pressure therein, pivot means attached to said diaphragm and to said lever means at a point along its extent intermediate said nozzles such that said lever means may pivot about said second named pivot means differentially with respect to said nozzles, biasing means positioned in said first chamber and against said lever means urging said lever means against said diaphragm, means including conduit means transmitting pressures existing in said box near the outlet thereof, said means being connected to the second of said chambers of said flow regulator to cause said diaphragm with said lever means attached thereto to move relative to said nozzles with variation in pressures in said box, conduit means connected to each of said nozzles in said box and connected respectively to said motor means for operating said valves in accordance with the pressures controlled by said nozzles and said lever means, and means connecting said first named chamber of said flow regulator to a reference pressure.

3. In air conditioning apparatus, a mixing box, a pair of inlets connected to said box and adapted to be connected to sources of a tempered air conditioning medium of different temperatures, valve means included in each of said inlets and adapted to control the flow of air conditioning medium through said inlets from said sources to the interior of said box, outlet means included in said box and adapted to discharge the tempered air therefrom to a space to be air conditioned, individual motor means positioned in said box and operatively connected respectively to said valve means in said inlets to operate said valve means, a thermostat positioned in the space to be air conditioned from said box, a source of control air pressure connected to said thermostat, a single output conduit from said thermostat connected to said mixing box having a control air pressure therein established by operation of said thermostat, a flow regulator positioned in said mixing box having a plurality of inlet connections thereto, one of said inlet connections to said flow regulator being connected to said single conduit and terminating in a bellows in said flow regulator, another pair of inlet connections to said flow regulator each including a restriction connected to said single conduit from said thermostat and terminating in said flow regulator in a pair of nozzles, diaphragm means positioned in said flow regulator and dividing said regulator into a pair of chambers a first of which includes said nozzles and said bellows, lever means pivoted at one extremity on said bellows and extending adjacent said nozzles to cooperate with said nozzles and establish a second and third control pressure therein, pivot means attached to said diaphragm and to said lever means at a point along its extent intermediate said nozzles such that said lever means may pivot about said second named pivot means differentially with respect to said nozzles, biasing means positioned in said first chamber and against said lever means urging said lever means against said diaphragm, means including conduit means transmitting pressure existing in said box near the outlet thereof, said means being connected to the second of said chambers of said flow regulator to cause said diaphragm with said lever means attached thereto to move relative to said nozzles with variation in pressures in said box, conduit means connected to each of said nozzles in said box and connected respectively to said motor means for operating said valves in accordance with the pressures controlled by said nozzles and said lever means, and further conduit means connected to said first named chamber of said flow regulator and including a bleed from said chamber to atmosphere.

4. In air conditioning apparatus, a mixing box, a pair of inlets connected to said box and adapted to be connected to sources of a tempered air conditioning medium of different temperatures, valve means included in each of said inlets and adapted to control the flow of air conditioning medium through said inlets from said sources to the interior of said box, outlet means included in said box and adapted to discharge the tempered air therefrom to a space to be air conditioned, individual pneumatic motor means positioned in said box and operatively connected respectively to said valve means in said inlets to operate said valve means, a thermostat positioned in the space to be air conditioned from said box, a source of control air pressure connected to said thermostat, a single output conduit from said thermostat connected to said mixing box having a control air pressure therein established by operation of said thermostat, a flow regulator included as a part of said mixing box having a plurality of inlet connections thereto, one of said inlet connections to said flow regulator being connected to said single conduit and terminating in a pressure motive means in said flow regulator, another pair of inlet connections to said flow regulator each including a restriction connected to said single conduit from said thermostat and terminating in said flow regulator in a pair of bleed ports, diaphragm means positioned in said flow regulator and dividing said flow regulator into a pair of chambers a first of which includes said bleed ports and said pressure motive means, flapper means pivoted at one extremity on said pressure motive means and extending adjacent said bleed ports to cooperate with said bleed ports and establish a second and third control pressure therein, pivot means attached to said diaphragm and to said flapper means at a point along its extent intermediate said bleed ports such that said flapper means may pivot about said second named pivot means differentially with respect to said bleed ports, biasing means positioned in said first chamber and against said flapper means urging said flapper means against said diaphragm, means including conduit means transmitting pressures existing in said means the outlet thereof, said means being connected to the second of said chambers of said flow regulator to cause said diaphragm means with said flapper means attached thereto to move relative to said bleed ports with variation in pressure in said box, and conduit means connecting said bleed ports to said pneumatic motor means to supply sources of control air to said motor means to operate the same and position said valves in said inlets differentially in accordance with space temperature and directly in accordance with outlet pressure from said box.

5. In air conditioning apparatus, a mixing box, a pair of inlets connected to said box and adapted to be connected to sources of a tempered air conditioning medium of different temperatures, valve means included in each of said inlets and adapted to control the flow of air conditioning medium through said inlets from said sources to the interior of said box, outlet means included in said box and adapted to discharge the tempered air therefrom to a space to be air conditioned, individual motor means positioned in said box and operatively connected respectively to said valve means in said inlets to operate said valve means, a thermostat positioned in the space to be air conditioned from said box, a source of control air pressure connected to said thermostat, a single output conduit from said thermostat connected to said mixing box having a control air pressure therein established by operation of said thermostat, a flow regulator included at said box having a plurality of inlet connections thereto, one of said inlet connections to said flow regulator being connected to said single conduit and terminating in a bellows in said flow regulator, another pair of inlet connections to said flow regulator each including a restriction connected to said single conduit from said thermostat and terminating in said flow regulator in a pair of nozzles, pressure responsive means positioned in said flow regulator and dividing said flow regulator into two chambers the first of which includes said nozzles and said bellows chamber, flapper means positioned in said first chamber and pivotally connected at said bellows chamber and said pressure responsive means, said flapper means being so positioned relative to said nozzles that expansion of said bellows chamber will pivot said flapper means about said pivotal connection on said pressure responsive means differentially with respect to said nozzles and such that said flapper means will be pivoted about said pivotal connection between said flapper means and said bellows chamber toward said nozzles upon increase in pressure in the second of said chambers acting against said pressure responsive means, means including conduit means transmitting pressures existing in said box near the outlet thereof, said means being connected to the second of said chambers to cause said pressure responsive means therein with said flapper means attached to move relative to said nozzles with variation in pressure in said box, and additional conduit means connecting each of said nozzles respectively to said motor means to supply source of control air pressure controlled by the position of said flapper means with respect to said nozzles to each of said motor means to position said valves in said inlets.

6. In air conditioning apparatus, a mixing box, a pair of inlets connected to said box and adapted to be connected to sources of a tempered air conditioning medium of different temperatures, valve means included in each of said inlets and adapted to control the flow of air conditioning medium through said inlets from said sources to the interior of said box, outlet means included in said box and adapted to discharge the tempered air therefrom to a space to be air conditioned, individual motor means positioned in said box and operatively connected respectively to said valve means in said inlets to operate said valve means, a thermostat positioned in the space to be air conditioned from said box, a source of control air pressure connected to said thermostat, a single output conduit from said thermostat connected to said mixing box having a control air pressure therein established by operation of said thermostat, a flow regulator included at said box having a plurality of inlet connections thereto, one of said inlet connections to said flow regulator being connected to said single conduit and terminating in a bellows in said flow regulator, another pair of inlet connections to said flow regulator each including a restriction connected to said single conduit from said thermostat and terminating in said flow regulator in a pair of nozzles, pressure responsive means positioned in said flow regulator and dividing said flow regulator into two chambers the first of which includes said nozzles and said bellows chamber, flapper means positioned in said first chamber and pivotally connected at said bellows chamber and said pressure responsive means, said flapper means being so positioned relative to said nozzles that expansion of said bellows chamber will pivot said flapper means about said pivotal connection on said pressure responsive means differentially with respect to said nozzles and such that said flapper means will be pivoted about said pivotal connection between said flapper means and said bellows chamber toward said nozzles upon increase in pressure in the second of said chambers acting against said pressure responsive means, means including conduit means transmitting pressures existing in said box near the outlet thereof, said means being connected to the second of said chambers to cause said pressure responsive means therein with said flapper means attached to move relative to said nozzles with variation in pressure in said box and additional conduit means connecting each of said nozzles respectively to said motor means to supply source of control air pressure controlled by the position of said flapper means with respect to said nozzles to each of said motor means to position said valves in said inlets, and further conduit means connected to the first of said chambers and said flow regulator and referencing the same to downstream pressure from the output of said mixing box.

References Cited in the file of this patent
UNITED STATES PATENTS

| | | |
|---|---|---|
| 1,972,766 | Ewald | Sept. 4, 1934 |
| 2,793,812 | McDonald | Mar. 28, 1957 |
| 2,835,449 | Joesting | Mar. 20, 1958 |